United States Patent [19]

Asmanes

[11] 4,172,398

[45] Oct. 30, 1979

[54] PRESET PIVOTAL TOOL HOLDER

[75] Inventor: Charles Asmanes, Oak Ridge, Tenn.

[73] Assignee: The United States of America as represented by the United States Department of Energy, Washington, D.C.

[21] Appl. No.: 881,966

[22] Filed: Feb. 28, 1978

[51] Int. Cl.² .................... B23B 3/28; B23B 29/00; B26D 1/12

[52] U.S. Cl. .................................... 82/12; 82/36 R; 407/7

[58] Field of Search ...................... 82/12, 36 R; 407/7

[56] References Cited

U.S. PATENT DOCUMENTS

| | | | |
|---|---|---|---|
| 209,361 | 10/1878 | Sandmeyer | 82/12 X |
| 2,233,724 | 3/1941 | Bannister et al. | 407/7 |
| 2,377,561 | 6/1945 | Linyard | 82/12 |
| 2,529,551 | 11/1950 | Hausam | 82/36 R |
| 2,651,223 | 9/1953 | Hahn | 407/7 |
| 3,128,657 | 4/1964 | Herbert | 82/12 X |
| 3,345,893 | 10/1967 | Holdridge | 82/12 |

FOREIGN PATENT DOCUMENTS 122969 8/1901 Fed. Rep. of Germany ............. 82/12

*Primary Examiner*—Harrison L. Hinson
*Attorney, Agent, or Firm*—Dean E. Carlson; Stephen D. Hamel; David E. Breeden

[57] ABSTRACT

A tool fixture is provided for precise pre-alignment of a radiused edge cutting tool in a tool holder relative to a fixed reference pivot point established on said holder about which the tool holder may be selectively pivoted relative to the fixture base member to change the contact point of the tool cutting edge with a workpiece while maintaining the precise same tool cutting radius relative to the reference pivot point.

2 Claims, 4 Drawing Figures

PRESET PIVOTAL TOOL HOLDER

BACKGROUND OF THE INVENTION

This invention was made during the course of, or under, a contract with the United States Department of Energy.

This invention relates generally to tool holding fixtures and more specifically relates to tool holding fixtures for precise pre-alignment of a radiused edge cutting tool relative to a fixed pivot point to establish a fixed cutting radius between the tool edge and the pivot point about which the tool may be selectively pivoted to change tool contact point with a workpiece during machining without realigning the tool.

Conventional tool holders for precision machining operations are capable of maintaining a cutting tool in one, and only one, position or point of contact on a radiused edge tool. If a shank type tool having a radiused cutting edge becomes nicked at the contact point with the workpiece during a machining operation, it is the general practice to replace the tool and recondition the cutting edge of the used tool by relapping the tool edge before it may be reused at a later date. Although some tool holders have the capability of changing the cutting angle to use a different cutting point on the radiused edge, the tool must also be realigned to establish the same tool edge position relative to the part or a tool reference position in the case of a numerical controlled machine.

With conventional techniques it has been found to be virtually impossible to realign the cutting edge such that the curvature or cutting radius of the new cutting point is identical to the previous cutting radius at another point on the tool edge. Since the tool is normally firmly held in a fixture by means of adjustable mechanical members, which must be set by an operator while realigning the tool with the aid of a microscope or other sensing devices, it becomes highly dependent on the skill of an operator to realign a tool with sufficient accuracy to prevent unacceptably large flaws when a tool must be realigned or a new tool installed and aligned during a machining operation.

A need, therefore, exists to provide a tool holder for a radiused edge cutting tool which allows an operator to preset the tool alignment and subsequently pivot the tool to selectively position the tool edge angularly with respect to the part while maintaining a constant tool edge radius with respect to the part throughout the selection pivot range. This will eliminate the time consuming and inaccurate realignment process to change the tool cutting edge point of contact with a workpiece during a machining operation and eliminating flaws in a precision part.

In view of this need, it is an object of this invention to provide a presettable, pivotal tool holding fixture for a radiused edged cutting tool which allows an operator to selectively pivot the tool about a preset constant cutting edge radius.

Other objects and many of the attendant advantages of the present invention will be obvious from the following detailed description taken in conjunction with the drawings.

SUMMARY OF THE INVENTION

The present invention may be summarized as a presettable, pivotal tool fixture for a radiused edge cutting tool including a base member having a fixed pivot point on one surface thereof, a tool holder selectively, pivotably mounted on said one surface of said base member to pivot about said pivot point on said base, said tool holder having an adjustable tool mount for receiving and holding said tool in a selected position so that when said holder is pivoted about said pivot point of said base, the cutting radius of said tool remains constant with respect to said pivot point. The adjustable holder allows an operator to preset the alignment of the tool in the holder so that the cutting edge radius remains constant about the fixed pivot point. Then the holder is mounted in the base member to pivot about the same pivot point and the tool edge contact point with a workpiece may be changed by pivoting the holder about the fixed pivot point without the necessity of realigning the tool relative to the workpiece.

DETAILED DESCRIPTION

Figure 1:
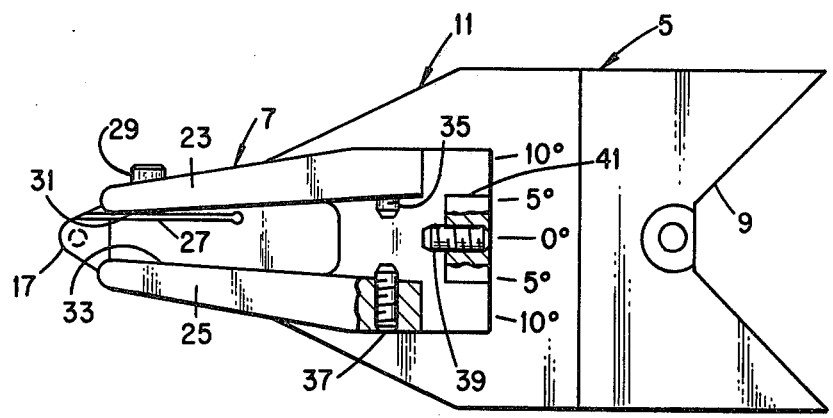
FIG. 1 is a top view of a presettable, pivotable tool holding fixture according to the present invention.
Figure 2:
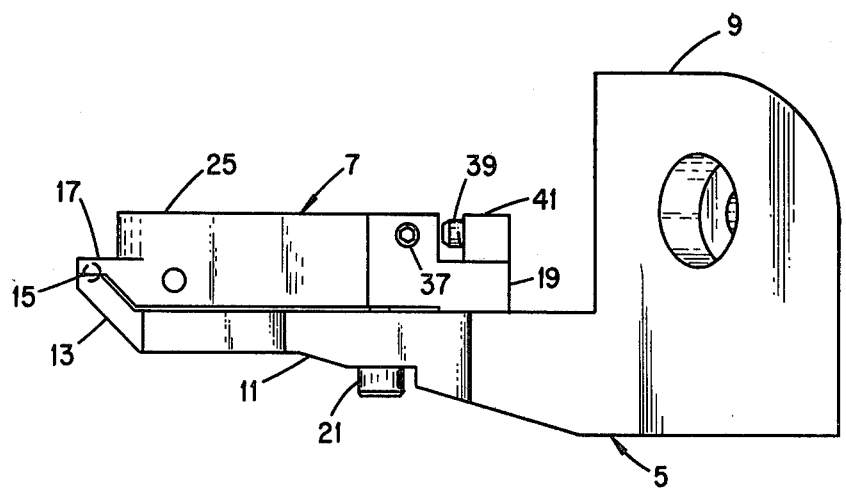
FIG. 2 is an elevation view of the tool holding fixture of FIG. 1.

Referring now to FIGS. 1 and 2, there is shown an embodiment of a tool holding fixture according to the present invention including a base member 5 adapted to carry a removable, selectively pivotable tool holder 7. The base member 5 is provided with an integral upstanding back portion 9 which bolts to a conventional wedge or dovetail type carriage mount.

The base has a horizontal extending, generally triangular tool holder support bed portion 11 which terminates in an angular up-sweep forward end portion 13 to form a support pedestal 15 at the forward edge of base 5 in which is mounted a ⅜ inch diameter steel ball 17. The steel ball 17 is secured in a depression in the platform 15 by means of an epoxy adhesive and forms the fixed pivot point about which the tool holder 7 is selectively pivoted. A degree index is provided on the top support surface of the base member 5 to aid an operator to selectively pivot the tool holder 7 supported on the upper face of the support bed portion 11 of the base 5. The index also aids the operator in keeping a record of the positions at which the tool has been used and thus prevents repositioning the tool in a previously used position of contact of the tool edge with the workpiece.

As shown, the tool holder 7 has a depression at the bottom forward edge which rests on the ball 17. The rearward lower portion 19 of the tool holder 7 is provided with a precision machined support base which rests on the upper face of base 5 and held firmly in place at the selected pivoted position by means of a clamp bolt 21 which extends through a radiused slot in the base 5 and threads into the bottom of tool holder 5. To pivot the holder to a new position, the operator simply loosens the bolt 21 and pivots the holder and retightens the bolt 21.

Figure 3:
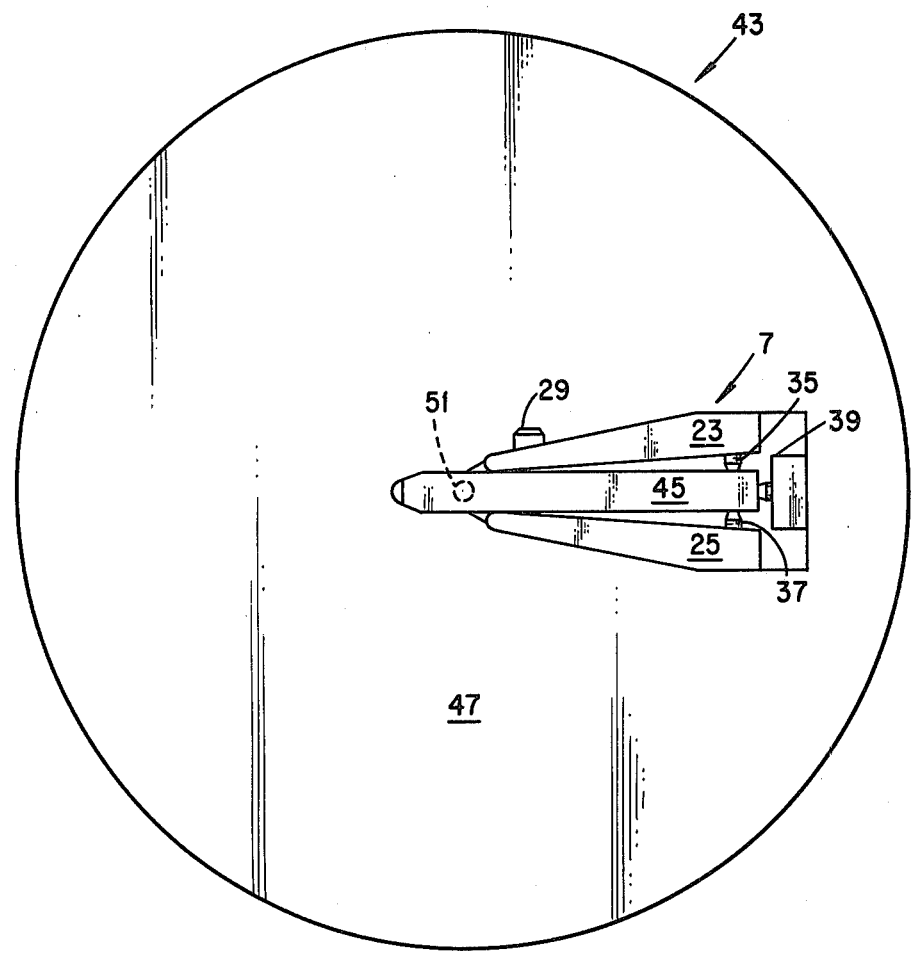
FIG. 3 is a top view of the tool holder portion of the fixture of FIG. 1 shown positioned on an alignment jig with a tool mounted in the holder to illustrate the manner in which the tool alignment is preset prior to being selectively, pivotally mounted in the tool holder base of the fixture.

The tool holder design, which allows prealignment of the tool for a constant tool edge radius about the fixed pivot point formed by the ball 17, includes upward extending side members 23 and 25 to form a cradle in which a rectangular shank tool is held, as shown in FIG. 3. The base of the cradle portion of the tool holder is provided with a slot 27 adjacent the side member 23 to form a clamp for holding the tool near the forward end of the tool holder. A bolt 29 is provided which is threaded into the base so that when it is tightened the tool is clamped at the forward edge 31 and 33 of the side members 23 and 25, respectively. This allows the tool to be pivoted for alignment in the cradle. The base of the tool holder 7 is generally triangular shape and the walls 23 and 25 are formed along the opposite edges of the base so that they taper away from the back portion of the tool shank.

A pair of diametrically opposed adjustment screws 35 and 37 are threaded through the back parts of the walls 23 and 25, respectively, and contact the tool shank so that the tool position in the holder may be preset before the holder is set in the base 5 in a manner as will be described hereinbelow. A third adjustment screw 39 is provided in an upstand back wall 41 for maintaining the selected tool edge radius. The screw 39 prevents the tool from sliding back in the holder and changing the tool radius once it is set.

Figure 4:
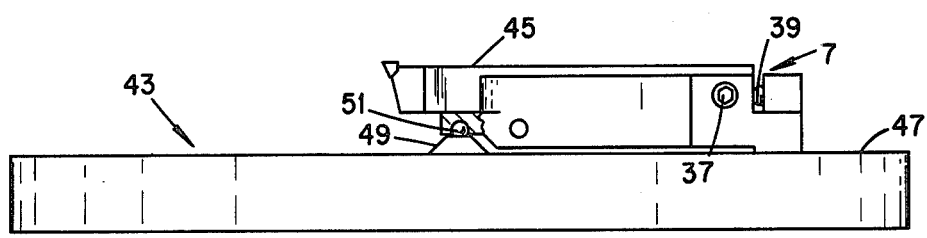
FIG. 4 is an elevation view of the tool holder and alignment jig of FIG. 3.

Referring now to FIGS. 3 and 4, wherein the tool holder 7 is shown positioned on an alignment jig 43 which is used to preset the tool 45 position within the tool holder 7 prior to mounting the holder on the base 5 as shown in FIGS. 1 and 2. The jig 43 includes a circular base 47 on which the tool holder 7 sets. At the center of the base 47 on an elevated pedestal 49 is a steel ball 51 to form the same fixed pivot point as on the base 5 with the steel ball 17. As in the base member 5 the ball 51 may be held in place in a matching radius depression in the pedestal 49 by using an epoxy cement. This allows the tool holder 7 to be pivoted on the base 47 while viewing the tool tip through a microscope to preset the tool radius.

The microscope may be provided with a reference point or arc in the lens system to which the tool radius is matched. First, the tool tip extension from the pivot point is set by adjusting the set screw 39 at the back of the tool shank. The tool holder is pivoted while viewing the tip through the microscope to check the accuracy of the tool tip radius. If the arc of the tip is not accurate with the tool shank centered between the wall members 23 and 25 as adjusted by the set screws 35 and 37, the tool is pivoted in the holder 7 by adjusting screws 35 and 37 until an accurate tool tip radius is obtained through a displacement range of about 20° relative to the fixed pivot point.

This alignment procedure allows an operator to preset the tool position in the holder so that when the holder is placed in the base 5 as shown in FIGS. 1 and 2 the operator may pivot the tool holder relative to the base without changing the tool cutting radius and eliminates the tedious job of realigning the tool relative to the part during a cutting operation.

It is very difficult to lap a hard material tool tip, such as carbide, diamond, etc. to form an accurate radiused tip due primarily to variations in hardness in the tool tip material. By presetting the tool tip radius as described above, the operator is able to use accurately lapped portions of the tool tip and, also use the tool longer in a cutting operation without sacrificing cutting accuracy.

Therefore, it will be seen that a very versatile and accurate tool holder is provided for precise prealignment and mounting of a radiused edge cutting tool used in machining of parts to accuracies of 25 microinches or less. Although the invention has been illustrated by means of description of a specific embodiment, it will be obvious to those skilled in the art that various modifications and changes may be made in the described embodiment without departing from the spirit and scope of the invention as set forth in the following claims forming a part of this specification.

What is claimed is:

1. A presettable tool holding fixture for fixed point contact machining of a workpiece by a selected cutting edge point of a radiused edge cutting tool comprising:
   a radiused edge shank type cutting tool;
   a base member having an upper tool holder receiving surface thereon and means forming a fixed pivot point at a forward end of said base member;
   a tool holder selectively, pivotably mounted on said upper surface of said base member and adapted to engage said base member to be selectively, incrementally pivoted about said fixed pivot point adjacent a forward end of said tool holder to select single incremental cutting points of contact about a preselected constant radius portion of said tool edge with respect to said pivot point, said tool holder including a cradle for receiving and holding the shank of said tool, said cradle including a pair of upward extending wall portions disposed to receive the shank of said tool therebetween, means for clamping the forward end of said tool shank adjacent the cutting edge thereof between the forward extending ends of said wall portions, said wall portions oriented to taper away from the rearward extending portion of said tool shank so that said tool may be pivoted in said cradle between said wall portion about the forward clamped end thereof and means carried by the rearward extending portion of said pair of wall portions of clamping said tool shank at any one of a plurality of selected pivoted positions between said wall portions aligning said selected constant radiused portion of said tool edge with respect to said pivot point.

2. The tool holding fixture as set forth in claim 1 wherein said means for forming a fixed pivot point includes a steel ball fixedly mounted on said base at a point coincident with said fixed pivot point, wherein said tool holder is provided with a depression on a bottom forward portion thereof which mates with said ball when said holder is mounted on said base, and further including clamping means for clamping said tool holder on said base at the selected pivotal position.

* * * * *